United States Patent
Binckley

[15] 3,686,938
[45] Aug. 29, 1972

[54] AUTOMOTIVE SAFETY SIDE WIND INDICATOR

[72] Inventor: Earle T. Binckley, 25055 Riverdell, El Toro, Calif. 92630

[22] Filed: June 28, 1971

[21] Appl. No.: 157,354

[52] U.S. Cl. ................................. 73/189, 116/28 R
[51] Int. Cl. ........................... G01w 1/02, B60q 9/00
[58] Field of Search .................... 73/188, 189; 116/28

[56] References Cited

UNITED STATES PATENTS

| | | | |
|---|---|---|---|
| 3,224,269 | 12/1965 | Weir | 73/189 |
| 3,343,412 | 9/1967 | Stout | 73/189 |
| 3,364,741 | 1/1968 | Hickox | 73/189 |

*Primary Examiner*—Richard C. Queisser
*Assistant Examiner*—C. E. Snee, III
*Attorney*—William C. Babcock

[57] ABSTRACT

A portable lightweight safety device formed from three parts that may be easily assembled and mounted on the hood portion of an automotive vehicle without the use of tools. The device when so mounted may be used in conjunction with the speedometer of the vehicle to determine the magnitude of the component of a side wind that is blowing in a direction normal to the longitudinal sides of the vehicle, a camper body mounted on the vehicle, or a trailer drawn by the vehicle. Such information is of vital importance to the safety of a vehicle driver in certain desert areas where side winds reach a magnitude sufficient to overturn a vehicle supporting a camper and trailers drawn by a vehicle.

5 Claims, 5 Drawing Figures

Patented Aug. 29, 1972

3,686,938

INVENTOR.
EARLE T. BINCKLEY
BY
William G. Babcock
ATTORNEY

AUTOMOTIVE SAFETY SIDE WIND INDICATOR

BACKGROUND OF THE INVENTION

1. Field of the Invention

An automotive safety side wind indicator.

2. Description of the Prior Art

In recent years the use of campers supported on a vehicle and trailers drawn by a vehicle as mobile homes has increased tremendously. Trailers and vehicle supported campers are frequently moved through desert areas in which side winds of high velocity are not uncommon. Due to the large longitudinal side areas of campers and trailers exposed to such side winds, the moving of campers and trailers is exceedingly hazardous when the side winds have an effective velocity normal to the longitudinal areas that exceeds a predetermined value. The velocity of a side wind below which it is safe to drive a vehicle supporting a camper or on pulling a trailer is somewhat variable and depends to a large extent on the center of gravity of the camper or trailer. In general it is not safe to drive a vehicle supporting a camper or one pulling a trailer when the velocity of the side wind is greater than twenty miles per hour.

The primary purpose in devising the present invention is to supply a device that may be removably mounted on the hood of a vehicle, and the reading on the device when used with the reading on the speedometer of the vehicle indicating the magnitude of the side wind to which the vehicle is subjected.

A further purpose for devising the present invention is to provide visual signal means that indicate when it is hazardous to drive a vehicle supporting a camper or a vehicle drawing a trailer in a side wind of substantial velocity.

SUMMARY OF THE INVENTION

A three piece lightweight portable device that includes a tubular upright, a vacuum cup for removably supporting the upright from the hood of a vehicle, and a vane and indicator assembly pivotally supported from the upright. The upright on the rearward surface thereof bears an arrow or other insignia that lies on an axis 45° offset to the direction in which the vehicle is moving. The vane assembly has two circumferentially spaced indicators thereon that are spaced 90 degrees apart, and when no side wind is blowing, the indicators will be on opposite sides of the arrow and spaced 45° therefrom.

When a side wind is blowing and it is desired to determine the velocity of the component of the side wind that is exerting a normally directed force on one longitudinal side of the vehicle, the driver of the vehicle varies the speed thereof, until the vane is disposed at a substantially 45° angle relative to the direction of travel of the vehicle. This is done by adjusting the vehicle speed until one of the indicators is aligned with the fixed arrow. The velocity of the side wind component normal to a side of the vehicle when such a situation prevails is that of the speed of the vehicle.

When the vane is disposed at an angle of 45° relative to the direction of travel of the vehicle, the force of the airstream on one side of the vane assembly that results from the forward motion of the vehicle is equal to the side wind component on the opposite side of the vane, and as a result the speedometer reading is the velocity of said side wind component.

A major object of the present invention is to provide a lightweight compact device that may be mounted on a portion of a vehicle forwardly of the driver therein, and the device including a vane and indicator assembly that is pivotally supported, and visually indicates when the vane assembly is at an angle of substantially 45° relative to the direction of travel of the vehicle. The speed of the vehicle when this situation occurs is the velocity of the component of the side wind that results in the vane assembly being so disposed.

Another object of the invention is to provide a device that may be mounted on a vehicle to permit the driver thereof to readily ascertain whether a side wind to which the vehicle is subjected is of sufficient magnitude as to render further driving hazardous.

A still further object of the invention is to supply a safety device that is readily available at all times to indicate whether further driving in a side wind is hazardous, as well as to at all times indicate to a driver the direction in which a side wind is blowing relative to the direction of travel of the vehicle.

A further object of the invention is to provide a safety device that is of an extremely simple mechanical structure, is inexpensive to produce, can be fabricated in the main from plastic materials, and can be retailed at a sufficiently low price as to encourage the widespread use thereof.

Yet another object of the invention is to provide a safety device that is sufficiently inexpensive, that it may be used as a premium or for advertising purposes.

A further object of the invention is to furnish a safety device that may be sold or stored in a dismantled condition, and easily assembled and installed on a vehicle without the use of hand tools.

DESCRIPTION OF THE PREFERRED EMBODIMENT

Figure 1:
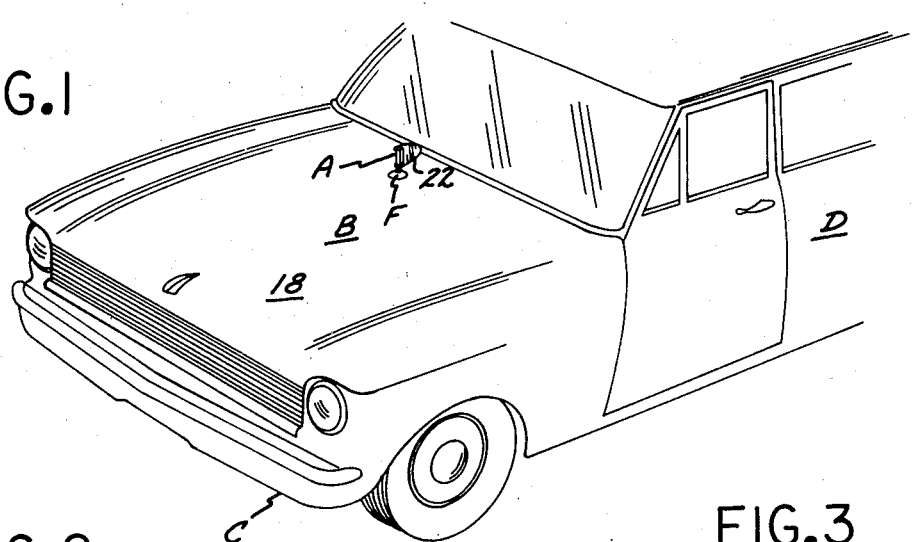
FIG. 1 is a perspective view of an automotive vehicle with the safety side wind indicating device mounted thereon.
Figure 2:
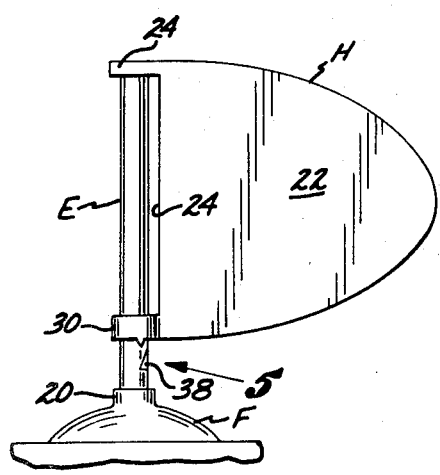
FIG. 2 is a side elevational view of the device.

The safety side wind indicating device A is shown in FIG. 1 as being removably secured to the hood B of an automotive vehicle C having longitudinally extending sides D. The sides D when the automotive vehicle C is being driven may be subjected to side winds of substantial magnitude as well as a camper (not shown) supported by the vehicle and also a trailer (not shown) drawn by the vehicle. Such side winds may be of sufficient magnitude as to render hazardous the driving of the vehicle C, and the device A serves to alert the driver of a vehicle when such a situation prevails.

Figure 4:
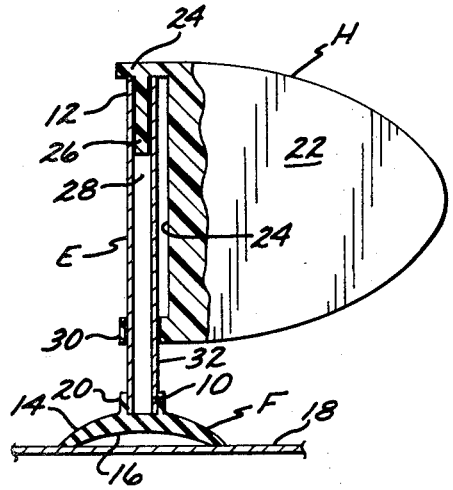
FIG. 4 is a combined side elevational and vertical cross sectional view of the device taken on the line 4—4 of FIG. 3.

The device A as best seen in FIG. 4 includes a rigid tubular upright member E that has a first lower end portion 10 and upper end portion 12. First supporting means F are provided that are secured to the lower end portion 10, and are preferably removably securable to a portion of the vehicle B forwardly of the driver (not shown) therein. In the drawing the first means F is illustrated as a vacuum cup 14 that is of conventional design, and when downwardly depressed onto the hood 18 of the vehicle B deform to establish a vacuum in the confined space 16 situated between the lower surface of the cup and the upper surface of the hood 18.

The vacuum cup 14 includes an upwardly extending tubular boss 20 that is frictionally engaged by the first end portion 10 of the tubular member E. The tubular member E has an insignia G located on the lower rearward portion thereof, and the insignia being centered on a longitudinal axis (not shown) that is 45° offset to the direction of travel of the vehicle B.

Figure 5:
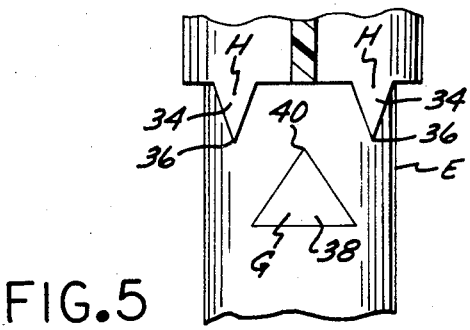
FIG. 5 is a fragmentary elevational view of a portion of the upright that bears an insignia, and the lower portion of the vane assembly which has indicator means thereon, to inform the driver of the vehicle not only the direction in which a side wind is blowing, but the velocity of said side wind.

A vane assembly H is provided that includes a vane 22 that is in the form of a relatively thin sheet and preferably semi-elliptical in shape, although other shapes may be used if desired. The vane 22 has a vertically extending forward edge 24. The vane 22 at the upper portion thereof adjacent the edge 24 develops into a forwardly extending tab 24 from which a pin 26 of circular transverse cross section projects downwardly to pivotally engage the vertically extending bore 28 defined in the tubular member. Vane 22 on the lower forward portion thereof develops into a forwardly extending ring 30 that loosely and pivotally engages the exterior surface 32 of the tubular member, when the pin 26 is disposed in the bore 28 as shown in FIG. 4. The ring 30 has visual indicating means H associated therewith, which means are illustrated in FIG. 5 as two downwardly extending triangular shaped members 34 that have the apexes 36 thereof separated by 90°, and the indicating means being so positioned that the triangular shaped members are disposed at 45° angulation relative to the center of the insignia G. The insignia G may be of various configurations, but is shown in FIG. 5 as a triangle 38 that has an apex 40 that is longitudinally aligned on an axis (not shown) that is 45° offset to the direction of travel of the vehicle. Pin 26 is longitudinally aligned with the center of ring 30. The device A as shown in FIG. 4 in position on the vehicle is illustrated in FIG. 1.

When the vehicle C is driven forwardly, and no side wind is exerted thereon, airstreams of equal velocity will flow past the sides of the vane 22, and the vane will remain in a position where it is longitudinally aligned on an axis (not shown) that is parallel with the direction of travel of the vehicle. However, in the event that a side wind is blowing relative to the vehicle C as the latter moves forwardly, the side wind will exert a laterally directed force on the vane 22 causing the vane to pivot towards one of the positions 22' shown in phantom line in FIG. 3. The force of the side wind on the vane 22 will cause it to assume an angular position relative to the direction of travel of the vehicle, and indicate to the driver of the vehicle the direction in which the side wind is blowing.

When the driver of the vehicle desires to determine the velocity of the component of the side wind that exerts a normally directed force on a side D of the vehicle C, the driver increases or decreases the speed of the vehicle until the apex 36 of one of the members 34 is vertically aligned with the apex 40 of the insignia G. When this situation prevails, the speedometer reading indicates the velocity of the component of the side wind that is exerting a normally directed force on a longitudinal side D of the vehicle C.

Figure 3:
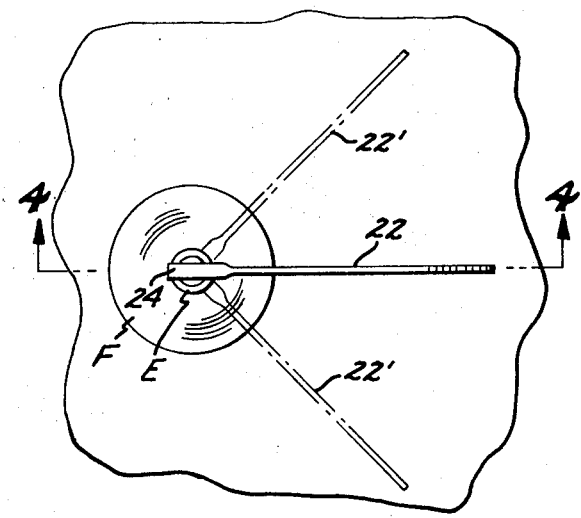
FIG. 3 is a top plan view of the device, with the vane being shown in phantom line in two positions that it may occupy when subjected to a side wind.

The reason that the speedometer reading is the same as the velocity of the component of the side wind is that when the vane 22 is disposed at an angle of 45° relative to the direction of travel, the force of the air-stream on one side of the vane due to forward movement of the vehicle, is equal to the force exerted by the side wind on the opposite side thereof. In FIG. 3 the vane 22 is shown in two positions indicated in phantom line and identified by the numeral 22'. Each of these positions can be occupied by the vane 22 only when the above described situation prevails, and a reading taken on the speedometer at the time to determine the velocity of travel of the vehicle also is the velocity of the component of the side wind that is exerting a normally directed force on one side D of the vehicle.

The insignia G and indicators 34 are shown on the rearward portions of member E and ring 30, but they may be positioned on the sides of the member and ring if desired for easier and more convenient and accurate reading. If the latter positioning is used, the vane 22 will be angularly positioned relative to indicators 34 rather than being centered therebetween.

I claim:

1. A safety device capable of being mounted on a portion of an automotive vehicle forwardly of the driver thereof for determining the magnitude of the component of a side wind that exerts a normally directed force on a side of said vehicle, said device comprising:

a. a rigid tubular member having first and second end portions;

b. first means that are secured to said first end portion and are capable of being secured to said portion of said automotive vehicle to support said tubular member in a substantially vertical position;

c. an insignia defined on the rearward portion of said tubular member that is visible to said driver;

d. a vane assembly pivotally supported at a fixed elevation on said tubular member, with the vane portion of said assembly being parallel to the direction in which said vehicle is moving due to airstreams of equal velocity flowing by opposite sides of said vane when said vehicle is subjected to no side wind; and e. visual indicating means on said assembly that cooperate with said insignia to inform said driver when said vane is disposed at an angle of substantially 45° to the direction of travel, with the driver of the vehicle being able to use said device to obtain the velocity of the component of a side wind directed normal to the side of said vehicle by varying the speed of said vehicle until said vane is disposed at an angle of 45° to the direction of travel of said vehicle, and said speed being the velocity of said component of said side wind that exerts a normally directed force on one longitudinal side of said vehicle.

2. A device as defined in claim 1 in which said first means is a vacuum cup formed from a resilient material, which cup includes an outwardly extending tubular boss that is frictionally engaged by said first end portion.

3. A device as defined in claim 1 in which said vane assembly includes a tab and ring that project from said vane, and a pin that extends from said tab towards said ring and is longitudinally aligned with the center of said ring, and said assembly pivotally supported from said tubular member when said ring is in rotatable engagement with the exterior surface thereof, and said pin extends downwardly into the upper interior of said tubular member.

4. A device as defined in claim 3 in which said indicating means are two pointed members that project outwardly from said ring and have the centers thereof separated by ninety degrees, with said pointed members being disposed forty-five degrees from the center of said insignia and on opposite sides thereof when said vehicle is being driven forwardly and there is no side wind.

5. A device as defined in claim 4 in which said insignia is of triangular shape.

* * * * *